United States Patent
Kappauf et al.

(10) Patent No.: US 6,198,193 B1
(45) Date of Patent: Mar. 6, 2001

(54) SUPPORTING CONFIGURATION FOR THE STATOR OF AN ELECTRIC MACHINE, IN PARTICULAR OF A TURBOGENERATOR

(75) Inventors: Horst Kappauf, Monheim; Fritz Sommer, Mülheim an der Ruhr, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/407,266

(22) Filed: Sep. 28, 1999

Related U.S. Application Data

(63) Continuation of application No. PCT/DE98/00761, filed on Mar. 13, 1998.

(30) Foreign Application Priority Data

Mar. 27, 1997 (DE) ............................................. 197 13 077

(51) Int. Cl.⁷ ...................................................... H02K 1/12
(52) U.S. Cl. ................................ 310/254; 310/91; 29/596
(58) Field of Search ............................... 310/51, 91, 254; 29/596

(56) References Cited

U.S. PATENT DOCUMENTS

| | | | | |
|---|---|---|---|---|
| 2,632,861 | * | 3/1953 | Morton et al. ....................... | 310/258 |
| 2,846,603 | * | 8/1958 | Webster et al. ...................... | 310/258 |
| 3,278,773 | * | 10/1966 | Mikina ................................... | 310/51 |
| 3,462,624 | * | 8/1969 | Darrieus ................................. | 310/51 |
| 3,789,252 | * | 1/1974 | Abegg ..................................... | 310/259 |
| 4,145,626 | * | 3/1979 | Aroshidze et al. .................... | 310/91 |
| 4,469,973 | * | 9/1984 | Guyot et al. .......................... | 310/258 |
| 4,564,779 | * | 1/1986 | Terry, Jr. ............................... | 310/258 |
| 4,593,223 | * | 6/1986 | Lehoczky ............................... | 310/258 |
| 5,521,448 | * | 5/1996 | Tecza et al. .......................... | 310/90.5 |

FOREIGN PATENT DOCUMENTS

| | | |
|---|---|---|
| 547 568 | 3/1974 | (CH) . |
| 1 057 214 | 5/1959 | (DE) . |
| 1 164 560 | 3/1964 | (DE) . |
| 1 220 022 | 6/1966 | (DE) . |
| 37 07 422 A1 | 9/1988 | (DE) . |
| 843101 * | 6/1981 | (SU) . |

OTHER PUBLICATIONS

Soviet Union Patent Abstract No. SU 843–101.
"Turbogenerators" Kraftwerk Union AG, Mar. 1982, 878216900 PA, pp. 3–21.

* cited by examiner

*Primary Examiner*—Nestor Ramirez
*Assistant Examiner*—Joseph Waks
(74) *Attorney, Agent, or Firm*—Herbert L Lerner; Laurence a. Greenberg; Werner H. Stemer

(57) ABSTRACT

A configuration for supporting a first part of a stator of an electric machine, in particular a turbogenerator, at a second part of the stator, in which the first part and the second part are at a distance from one another and at least partially surround an axis of rotation of a rotor shaft in a rotation direction. The two parts are each supported against one another by an integral supporting element at least at three locations distributed around the axis of rotation. The supporting elements each have a material strip which is bent in a single plane, between their ends, so that the distance between the two parts is variable when the material strip is subjected to bending deformation in the axial direction and radial direction of the turbomachine. The support is rigid in the tangential direction due to the stiffness of the material strips transversely with respect to the bending course. Due to the bent metal strips, the configuration can be produced in such a way that it saves space and is cost-effective. The assembly effort is considerably less than that of previously known supporting configurations.

10 Claims, 3 Drawing Sheets

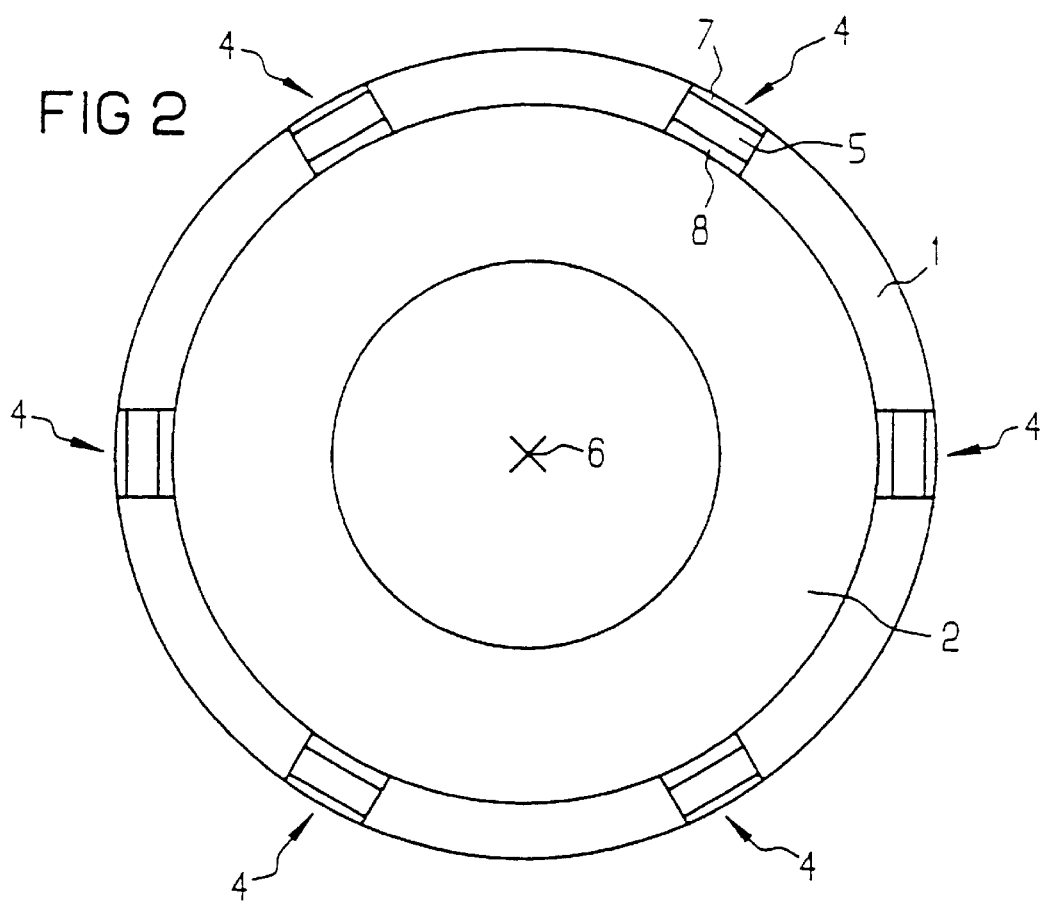
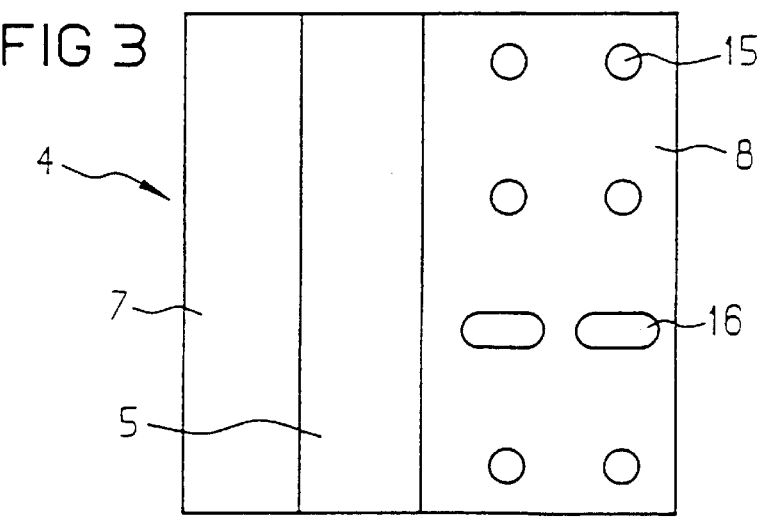

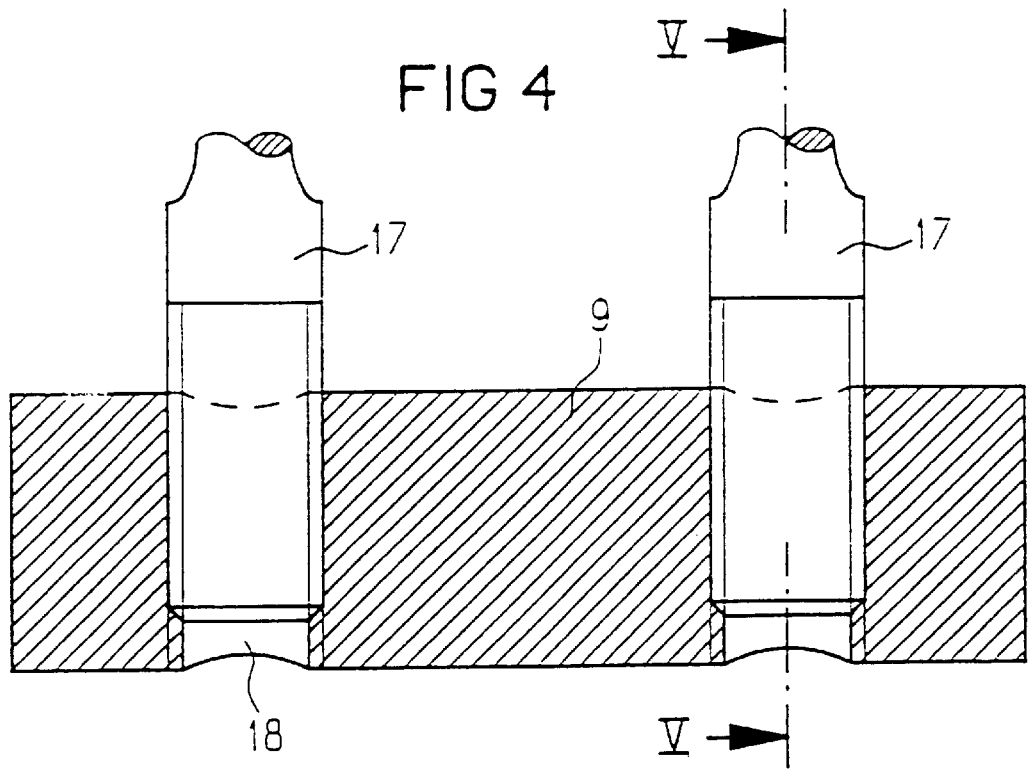
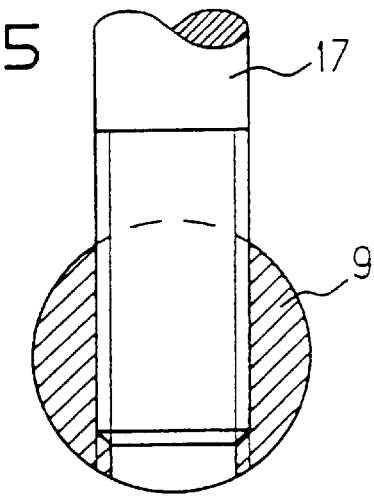

SUPPORTING CONFIGURATION FOR THE STATOR OF AN ELECTRIC MACHINE, IN PARTICULAR OF A TURBOGENERATOR

CROSS-REFERENCE TO RELATED APPLICATION

This application is a continuation of copending International Application No. PCT/DE98/00761, filed Mar. 13, 1998, which designated the United States.

BACKGROUND OF THE INVENTION

1. Field of the Invention

The invention relates to a configuration for supporting a first part of the stator of an electric machine, in particular of the stator of a turbogenerator, at a second part of the stator.

In electric machines, such as generators, for converting mechanical energy into electrical energy or vice versa, a rotor shaft rotates during the energy conversion, in a stator cavity that is generally approximately rotationally symmetrical. A number of different turbogenerators are described in a document issued by Kraftwerk Union AG, Mülheim/Ruhr, Germany, Order No. K/10437-01 dated March 1982 (referred to below as the KWU document). Another document, in which turbogenerators and parts of turbogenerators are described, was issued by Siemens AG, Bereich Energieerzeugung [Power Generation Division] (KWU) Freyeslebenstr. 1, D-91058 Erlangen, Germany under the Order No. A96001-U111-A244 (referred to below as the Siemens document) in September 1993. Both documents describe stator electrical windings which have so-called winding overhangs at one or both axial ends. Stator winding overhangs of hydrogen-cooled turbogenerators may be supported with the aid of a solid supporting ring, which is preferably formed of glass fiber-reinforced plastic and is approximately rotationally symmetrical. The supporting ring is in turn supported on a pressure plate, through the use of which a laminated core of the stator is held by core pressure. The laminated core is used to reinforce the magnetic field in the stator winding. In that case the stack direction is approximately parallel to the axis of rotation of the rotor shaft. The support between the supporting ring and the pressure plate has a number of functions. On one hand, in the vertical direction, it bears the natural weight of the supporting ring and that of the parts which are supported by the supporting ring, in particular the winding overhang. On the other hand, it prevents the winding overhang from twisting during operation of the turbogenerator or in the event of a defect. In addition, it has other functions, such as damping of oscillations which occur during operation of the turbogenerator and compensating for distance changes and relative displacements of parts of the stator caused by thermally dependent expansion and contraction.

Supports are known which are constructed especially for the purpose of carrying out certain of the functions already mentioned, for example friction bearings specifically for absorbing the force resulting from the weight of the supporting ring and of the winding overhang. The overall support includes a multiplicity of components of different types. The multiplicity of components require an area which is at the expense of the area available for other parts disposed in the region of the pressure plate and of the supporting ring. In addition, the interaction of the individual components necessitates appropriate precision in their production.

German Published, Prosecuted Patent Application 1 057 214 specifies a device on single-phase, high-power alternators for sprung torque transmission from the stator to a machine foundation, with the inclusion of spring elements disposed between an iron body of the machine and an outer housing. The spring elements, which act on both sides of the periphery of the iron body fitted with the winding, are in the form of spring supports or spring columns and are supported on parts of the outer machine housing which are themselves supported like brackets on the foundation. That is done in such a way that vibration forces which occur are absorbed on housing parts supported rigidly on the foundation, and are transmitted to the foundation.

German Published, Prosecuted Patent Application 1 164 560 discloses a housing casing for electric machines having longitudinal ribs which are disposed between the housing casing and the laminated stator core, are distributed approximately uniformly around the circumference of the laminated core and are located with their cross-section in a direction other than the radial direction with respect to the longitudinal axis of the housing. In that case, the direction of at least some of the ribs (which are provided with at least two stiffening rings) deviates alternately to one side or the other of the radial. A total sum of the mean deviations from the radial to one side is approximately equal to a total sum of the angular deviations from the radial to the other side.

German Published, Prosecuted Patent Application 1 220 022 discloses an electric machine having a cylindrical stator housing, in which rings are disposed at ends of the stator housing in order to damp oscillations. In that case, the stiffness of the rings is greater than that of the stator housing and they are connected by connecting a device (which is disposed at a plurality of locations distributed around the circumference) to the stator housing. That is done in such a manner that, in the event of any relative movement between the rings and the end surfaces of the stator housing, friction forces are produced which counteract the housing oscillation.

German Published, Non-Prosecuted Patent Application DE 37 07 422 A1 relates to a method for the attachment of the stator core in an electrical three-phase alternator, in which a clamping ring is disposed on the outer circumference of the stator core, and that clamping ring is firmly connected to the stator core, at least at predetermined locations. Furthermore, alternator housing parts are brought into contact with the clamping ring, and are braced with respect to one another, on both sides of the clamping ring. The clamping ring has axial passages, preferably formed by a sheet-metal strip which forms the clamping ring having a general corrugated shape. In that way, the internal channel cross-section for the cooling air which flows through the alternator is varied by the various options for the contact between the annular surfaces of the housing on both sides.

Swiss Patent 547 568 discloses a holding device for the stator of a dynamo-electric machine. The stator is disposed between a pair of end frames within a non-load-bearing outer casing. The holding device is used to isolate stator vibration from other parts of the dynamo-electric machine. The holding device has at least one pair of vertical spring plates which are disposed on opposite sides of the stator. One end of each spring plate is attached to the stator and the other end of each spring plate is attached to a load-bearing foundation. The non-load-bearing outer frame, which is disposed around the stator between the end frames and has no contact with the spring plates and the stator, is constructed in such a way that stator vibration can be transmitted directly to the foundation, and not to the outer frame.

Soviet Union Inventor's Certificate 843101 shows a stator of a hydrogenerator. The stator is hung in a frame. The frame is formed by annular components which surround the stator and to which the stator is fastened through bendable clamps.

SUMMARY OF THE INVENTION

It is accordingly an object of the invention to provide a configuration for supporting a first part of a stator of an electric machine, in particular of a turbogenerator, at a second part of the stator, which overcomes the hereinafore-mentioned disadvantages of the heretofore-known configurations of this general type, in which the supporting configuration not only absorbs a force resulting from the weight of the parts to be supported and allows axial and radial distance changes between the two parts but also very largely prevents any twisting of a winding overhang, and in which components of the supporting configuration occupy as little space as possible and can be produced and assembled as cost-effectively as possible.

With the foregoing and other objects in view there is provided, in accordance with the invention, in an electric machine including a stator having a rotor shaft with an axis of rotation and a rotation direction and having first and second stator parts mutually separated by a distance and at least partly surrounding the axis of rotation in the rotation direction, a configuration for supporting the first part at the second part, comprising one-piece or integral supporting elements each disposed at a respective one of at least three locations distributed about the axis of rotation for supporting the two parts against one another, in order to prevent the two parts from twisting relative to one another; the supporting elements each having two ends and a material strip bent in a single plane between the ends for varying the distance between the two parts upon subjecting the material strips to bending deformation in axial direction and radial direction of the electric or turbomachine; and the material strips having a stiffness transverse to a bending course or profile causing the support to be rigid in tangential direction.

The term "axial direction" means a direction parallel to the axis of rotation of the rotor (generator shaft, rotor shaft) of the turbomachine. Accordingly, any imaginary line in the radial direction intersects the axis of rotation at right angles. For each reference point in the region of the stator of the turbomachine, there is just one tangential direction, which is defined by the tangent at the reference point to a circular line passing through the reference point and is rotationally symmetrical with respect to the axis of rotation of the stator. A material strip which is bent in a single plane in this context means a material strip having a shape that can be achieved by bending a planar material strip which can be bent. The material strip is bent exclusively about axes which are imaginary or actually exist and are all parallel to a reference direction lying in the plane of the unbent material strip, with the reference direction being in a fixed position in the material strip. In consequence, after being bent in the reference direction and in directions parallel to the reference direction, the material strip extends along straight lines. This method is just an example to illustrate the shape. The material strips which are actually used in the configuration according to the invention may be produced by using other methods.

The configuration according to the invention allows support which is free of any friction between different parts. One or more integral supporting elements according to the invention may, for example, carry out the function of the friction bearings, which are known from the prior art, for absorbing the force resulting from the weight of the supporting ring and of the winding overhang. In particular, supporting elements which are disposed approximately at the level of the axis of rotation of the rotor shaft can absorb the force resulting from the weight without any significant bending deformation, since the reference direction mentioned above runs approximately vertically downwards, transversely with respect to the bending profile. At the same time, like the other supporting elements of a configuration according to the invention, these supporting elements can very largely prevent twisting of the winding overhang. Large forces acting in the tangential direction may occur, particularly in the event of sudden acceleration or deceleration of the rotational movement of the rotor shaft, which lead to unacceptable twisting of the winding overhang, without any suitable supporting configuration. One major advantage of the configuration according to the invention is thus that it avoids frictional wear on components of the support and of the stator winding insulation.

A supporting element with a bent material strip can be produced easily and cost-effectively. As a result of the fact that the material strip is bent, it occupies a small amount of space. The same supporting elements are preferably used at all of the individual supporting locations in the configuration according to the invention. This is feasible due to the mechanical characteristics of the bent material strip. The material strips react to forces acting in the axial and radial directions by bending deformation which is preferably elastic. In the process, it is able to counteract forces which are constant over time, for example the forces resulting from the weight of a winding overhang, by corresponding resistance. At the same time it is able to react flexibly to forces which vary with time, for example those caused by thermally dependent position changes of the two parts to be supported against one another, or from oscillations. The capability of the material strip to bend in particular avoids undesirable constraints that result, for example, from copper evolvents migrating out of a winding overhang. Tangentially acting forces, in particular those caused by electromagnetic interaction between the rotor and the stator, are transmitted virtually unchanged by it from one end to the other due to its stiffness. Therefore, it prevents any undesirable relative rotational movement of the two parts which are to be supported against one another.

In accordance with another feature of the invention, the material strips run in a serpentine curved shape in longitudinal axial sections of the turbomachine and extend in a straight line approximately in the tangential direction at right angles to the section planes. The term "longitudinal axial section" means a planar section, in which the axis of rotation of the rotor of the turbomachine lies in the section plane.

In accordance with a further feature of the invention, the material strips each run, in longitudinal axial sections of the turbomachine, along a line which in each case describes approximately a quarter-circle at the ends, the quarter-circle merges into a straight linear piece, and the straight linear pieces are connected to one another by the serpentine piece. There are also refinements which have a plurality of serpentine pieces in a meandering shape in accordance with the required mechanical characteristics, in particular the stiffnesses of the material strip. Apart from forming the material strip in such a way, the mechanical characteristics of the material strip can be controlled by its length, the choice of material, and the thickness of the material strip.

In accordance with an added feature of the invention, the first part, which is supported on the second part, is a pressure plate, through the use of which a laminate stack with a stack direction approximately parallel to the axis of rotation of the rotor shaft can be held by stack pressure.

In accordance with an additional feature of the invention, the second part is a supporting ring, preferably made of glass-fiber-reinforced plastic (GFRP), which supports and/or is fitted with an electrical winding of the stator, at least in a region of electrical connections of the winding.

In accordance with yet another feature of the invention, at least one of the material strips is connected at one of its ends to a first connection element and at the other of its ends to a second connection element, and the connection elements are each firmly connected to one of the parts.

In accordance with yet a further feature of the invention, the two connection elements and the material strip are formed of metal and the two connection elements are welded to the material strip. It is preferable for the welding to be carried out before the assembly of the supporting element and for the welding seams to be butt seams which have been ground in order to increase fatigue strength.

In accordance with yet an added feature of the invention, the first part is formed of metal, at least at a connection location for the at least one supporting element to the connection elements, and is welded to the first connection element. The thickness of the first connection element is preferably about 50% greater than the thickness of the material strip. This refinement makes it easier to weld the supporting element to the first part.

In accordance with yet an additional feature of the invention, the second connection element is connected to the second part by a plurality of bolts, preferably through the use of expanding bolts, with the bolts in each case extending approximately in the radial direction and their heads on the outside. The second connection element is preferably constructed to be considerably thicker than the material strip, in order to allow the second connection element to be screwed tightly without stressing the material strip. In the case of large turbomachines, in particular for turbogenerators with ratings over 100 MW, it is expedient for the second connection element to have a thickness of 30 to 45 mm, preferably a thickness of about 40 mm. In the case of turbomachines such as this, the material strip has a thickness of 10–15 mm, preferably about 13 mm, and a constant width of 200–400 mm, preferably about 300 mm.

In accordance with again another feature of the invention, the second part has at least one hole, which runs approximately parallel to the axis of rotation of the rotor shaft, and a threaded socket is disposed in the at least one hole and is screwed to the second connection element. The threaded socket preferably has two holes with internal threads, and is made of steel. In the case of this refinement of the supporting configuration according to the invention, a screw attachment of the second connection element to the second part can be achieved easily and reliably during assembly, with a uniform contact pressure.

One advantage of the embodiments having a screw attachment of the second connection element to the second part is that this makes it possible to compensate, in a simple manner, for production tolerances in the production of the two parts which are supported against one another by the supporting element and/or in the production of the supporting element. Tolerances are compensated for on one hand by using filling plates, which are disposed between the second connection element and the second part, and on the other hand by constructing the holes in the second connection element for holding bolts as elongated holes.

In accordance with again a further feature of the invention, the two parts are supported with respect to one another in such a way that the connection locations of the two parts for the supporting elements are each located approximately on a circular line having a center which is roughly on the axis of rotation of the rotor shaft.

In accordance with a concomitant feature of the invention, the connection locations are in each case distributed approximately uniformly around the axis of rotation of the rotor shaft. In other words, the lines connecting them to a point on the axis of rotation include angles of approximately the same size between them.

The material strip of the support element may, for example, be a sheet-metal strip and may be formed by bending around an axis or by bending around a plurality of mutually parallel axes. Conventional sheet-metal bending tools may be used.

Other features which are considered as characteristic for the invention are set forth in the appended claims.

Although the invention is illustrated and described herein as embodied in a supporting configuration for the stator of an electric machine, in particular of a turbogenerator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a reduced, cross-sectional view of a supporting configuration, at right angles to an axis of rotation;

FIG. 3 is an enlarged, elevational view of a supporting element as viewed in a radial direction;

FIG. 4 is a fragmentary, enlarged, longitudinal-sectional view of a threaded socket; and FIG. 5 is a fragmentary, cross-sectional view of the threaded socket which is taken along a line V—V of FIG. 4, in the direction of the arrows.

DESCRIPTION OF THE PREFERRED EMBODIMENTS

Figure 1:
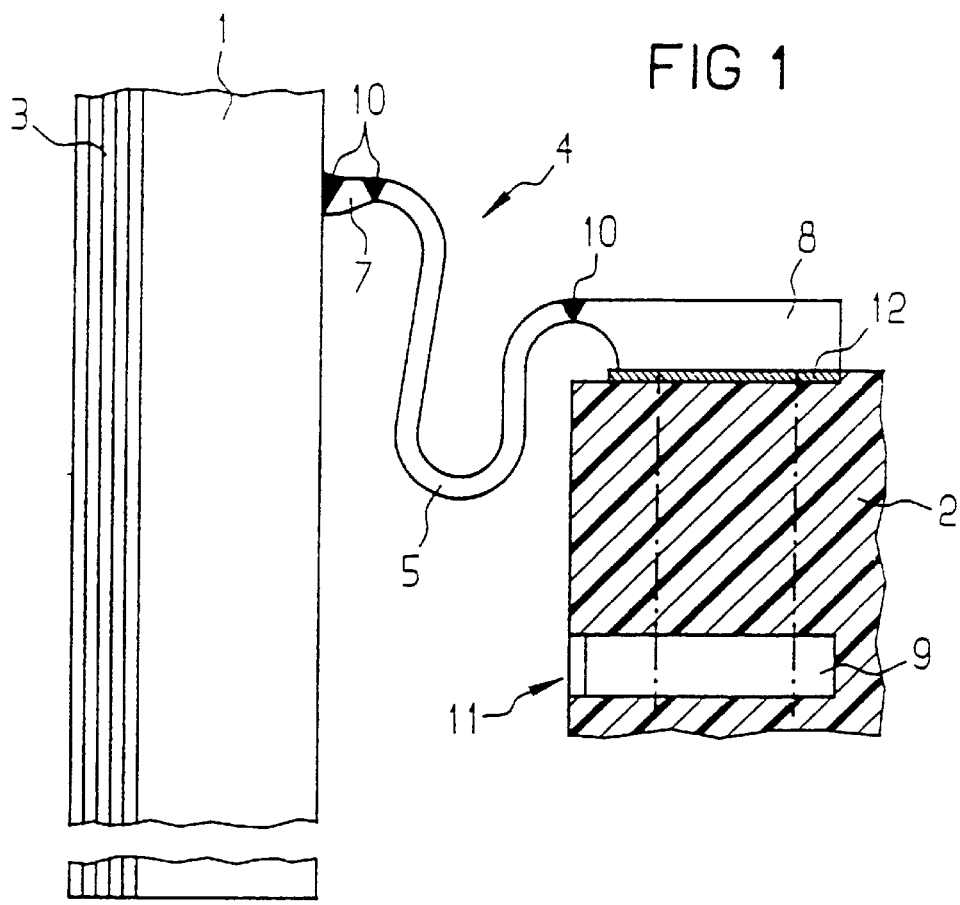
FIG. 1 is a fragmentary, diagrammatic, longitudinal axial-sectional view of a supporting configuration.

Referring now to the figures of the drawings in detail and first, particularly, to FIG. 1 thereof, there is seen a longitudinal axial section of a supporting configuration according to the invention, having a sectional plane in which an axis of rotation 6 of a rotor shaft lies. A pressure plate 1 (a first part of the stator) and a supporting ring 2 (a second part of the stator) made of glass-fiber-reinforced plastic (GFRP ring) are supported with respect to one another by a supporting element 4. The pressure plate 1 holds a laminated core 3, shown on the left-hand side of the figure, under core pressure. An opposing bearing of the laminated core, for example a second pressure plate, is not shown. The supporting element 4 has a sheet-metal strip 5 which is connected at its ends by welded seams 10 to a first connection element 7 and to a second connection element 8. The first connection element 7 is connected to the pressure plate 1 by a further welded seam 10. The welded seams 10 are butt seams. The supporting element 4 is connected to the GFRP ring 2 by the second connection element 8. The connection is constructed as a screw connection. Bolts, which are shown by dot-dash lines in FIG. 1, extend from the second connection element 8 through a filling plate 12 that is used to compensate for production tolerances and through holes in the GFRP ring 2 to a threaded socket 9 which has holes with internal threads. The threaded socket 9 is disposed in a hole 11. The pressure plate 1 is illustrated as being interrupted in the direction of the axis of rotation 6. At the bottom of FIG. 1, a further part of the rotationally symmetrically constructed integral pressure plate 1 can be seen, as well as a piece of the laminated core 3.

The filling plate 12 allows tolerances to be compensated for in the radial direction, for one supporting element 4 at a single point in each case. Such tolerance compensation may be necessary, for example, as a result of mechanical machining of the GFRP ring 2, as a result of manufacturing tolerances in the production of the supporting element 4, and as a result of tolerances from the welding of the supporting element 4 to the pressure plate 1.

In the section plane shown in FIG. 1 and starting at the pressure plate 1, the supporting element 4 first of all runs approximately at right angles to a surface of the pressure plate 1, then roughly describes a quarter of a circle to the right, merges into a straight piece (to which a serpentine piece is connected which in turn merges into a shorter straight piece) and, describing a quarter of a circle to the right, expands into the second connection element 8. If the supporting element 4 is constructed, for example, for use in turbogenerators made by Siemens AG, Type THDF (described in the KWU document and in the Siemens document mentioned above), then the sheet-metal strip 5 has, for example, a thickness of 5 to 15 mm. In this case, the second connection element has a thickness of about 40 mm. With these dimensions, the supporting element 4 is able to absorb forces of 5 kN to 20 kN in the radial direction. Forces of 10 kN to 100 kN can be transmitted in the tangential direction through the supporting element 4, which is rigid in this direction.

FIG. 2 shows a supporting configuration, in a cross-section taken at right angles to the axis of rotation 6 of the rotor shaft and through the GFRP ring 2. There are a total of six supporting elements 4 connecting the pressure plate 1 to the GFRP ring 2. The first connection element 7 of the supporting element 4 is welded to the pressure plate 1. The second connection element 8 is screwed to the GFRP ring 2. The supporting elements 4 are at equal angular intervals to one another and are each disposed at the same distance from the axis of rotation 6. Six to ten physically identical supporting elements are preferably also used in other embodiments.

FIG. 3 shows a supporting element 4 as viewed in a direction which, when extended, crosses the axis of rotation of the rotor shaft at right angles. The second connection element 8 of the supporting element 4 has a total of eight holes 15, 16 for screw connection of the supporting element 4. The holes may be formed as holes 15 with a circular cross-section or as elongated holes 16 with an oval cross-section. The elongated holes 16 allow compensation for tolerances in the production of the supporting element 4 or in the production of the parts to be supported.

FIG. 4 shows a longitudinal section through a threaded socket 9 having two holes 18 with internal threads and having expanding bolts 17 screwed into the holes 18. FIG. 5 shows a cross-section taken along a line V—V in FIG. 4 and illustrates the circular cross-section of the threaded socket 9. The threaded socket 9 may be disposed, for example, in a hole 11, as is shown in FIG. 1.

A total of four threaded sockets, shown in FIG. 4 and FIG. 5, are required for the screw connection of the supporting element 4 shown in FIG. 3. Other embodiments of the supporting element according to the invention have holes 15, 16 for screw connections in two parallel rows with three holes in each case and five holes 15, 16 in each case. M20 to M30 expanding bolts are preferably used for the screw connection.

Supporting elements for the supporting configuration according to the invention may be produced in a small number of process steps. The extent of mechanical machining is low. Proven techniques may be used for installation of the supporting elements. The assembly complexity is somewhat less than in the case of previously known supporting elements. The invention thus offers a high potential for financial savings.

We claim:

1. In an electric machine including a stator having a rotor shaft with an axis of rotation and a rotation direction and having first and second stator parts mutually separated by a distance and at least partly surrounding the axis of rotation in the rotation direction, a configuration for supporting the first part at the second part, comprising:

first and second connection elements formed of metal each firmly connected to a respective one of the parts being supported against one another;

one-piece supporting elements each disposed at a respective one of at least three locations distributed about the axis of rotation for supporting the two parts against one another;

said supporting elements each having two ends and a metal material strip bent in a single plane between said ends for varying the distance between the two parts upon subjecting said material strips to a bending deformation along a bending course in an axial direction and a radial direction of the electric machine;

said material strip of at least one of said supporting elements having one end welded to said first connection element and another end welded to said second connection element; and said material strips having a stiffness transverse to said bending course causing said supporting elements to be rigid in tangential direction.

2. The configuration according to claim 1, wherein said material strips run in a serpentine curved shape piece in longitudinal axial sections of the electric machine and extend in a straight line approximately in the tangential direction at right angles to section planes.

3. The configuration according to claim 2, wherein said material strips each run, in the longitudinal axial sections of the electric machine, along a line having ends approximately describing a quarter-circle, said quarter-circles merge into a straight linear piece, and said straight linear pieces are connected to one another by said serpentine piece.

4. The configuration according to claim 1, wherein the first part is a pressure plate holding a laminated core with core pressure, the laminated core having a core direction approximately parallel to the axis of rotation of the rotor shaft of the electric machine.

5. The configuration according to claim 1, wherein the first part has a connection location to said at least one supporting element and is formed of metal at least at said connection location, said first connection element is welded to the first part, and said first connection element has a thickness greater than a thickness of said material strip.

6. The configuration according to claim 5, wherein the thickness of said first connection element is approximately 50% greater than the thickness of said material strip.

7. The configuration according to claim 1, including a plurality of bolts connecting said second connection element to the second part, said bolts each extending approximately in radial direction and having heads on the outside.

8. The configuration according to claim 7, wherein the second part has at least one hole running approximately parallel to the axis of rotation of the rotor shaft and a threaded socket disposed in said hole and screwed to said second connection element.

9. The configuration according to claim 1, wherein the two parts have connection locations for said supporting elements, and said connection locations are each located approximately on a circular line having a center roughly on the axis of rotation of the rotor shaft.

10. The configuration according to claim 1, wherein the two parts have connection locations for said supporting elements, and said connection locations are distributed approximately uniformly around the axis of rotation of the rotor shaft.

* * * * *